UNITED STATES PATENT OFFICE.

EDUARD WÜRL, OF PRAGUE, AUSTRIA-HUNGARY.

PROCESS OF MANUFACTURING BRIQUETS.

No. 826,007.      Specification of Letters Patent.      Patented July 17, 1906.

Application filed November 18, 1904. Serial No. 233,360.

*To all whom it may concern:*

Be it known that I, EDUARD WÜRL, a subject of the Emperor of Austria-Hungary, residing at Prague, in Bohemia, Austria-Hungary, have invented certain new and useful Improvements in Processes of Manufacturing Briquets, of which the following is a specification.

According to all processes hitherto known for the manufacture of fodder-cakes, compressed fodder, and the like from plants binding agents must be added in order to retain the parts of the fodder-plants in the shape imparted to them by the pressing operation. The binding agents employed for this purpose consist in foodstuff—such as bruised grain, flour, and the like—prepared in the shape of a dough kneaded together with industrial waste materials of vegetal origin, hay, or chopped hay and then pressed to form fodder-cakes. In order to impart durability to mixtures of this kind, the fodder-cakes must then be heat-dried. All those processes have for their sole object to effect a reduction in the volume of such mixtures composed of highly-moistened rich foodstuffs and hay or chopped hay; but all of them require a considerable amount of time and working expenses, and they suffer under the disadvantage directly due to the use of hay or chopped hay—namely, that losses of the most valuable vegetal and nutritive matter contained in the grasses, clovers, combined fodder, and the like are unavoidable. The said losses are caused by the usual methods of harvesting—that is to say, by allowing the plants when mown to lie out upon the standing-place and to dry in the fields by the air and the heat of the sun and under continuous influence of the weather. By the action of the dew and in a still higher degree by that of rain the mown plants are deprived of some of their valuable nutritive ingredients, and the agglutinants, such as pentosanes and others, contained in the plants, especially on their surfaces, are chemically altered or washed away.

The method forming the object of the present invention renders possible the manufacture of durable preserved fodder briquets from fodder-plants and without the addition of separate binding agents, the said fodder briquets possessing the full nutritive tenor of the components.

The improved method enables the farmer to convert fodder-plants, independently from atmospheric conditions and at any desired stage of their growth without any losses of the very best portions of the plants and of the most valuable nutritive ingredients, into handy and durable preserve briquets.

The improved process consists in that the fresh newly-mown green plant-fodder, either in the mown state or cut into chaff, is admitted into a drying apparatus, where it is deprived of its tenor in water by an artificial drying operation, whereafter it is moistened again, but only to such a degree as is necessary to impart to it the suppleness required for the pressing operation and to restore the binding property of the organic agglutinants, such as pentosanes and others contained in the plants themselves for the purpose that at the final pressing of the plants or portions of plants into briquets they should adhere together and permanently retain the shape imparted to them by the pressing operation.

The slight moistening of the artificially-dried fodder-plants or portions of plants may be effected by admitting a current of moist air or by the aid of steam to pass through the same.

Before or after the remoistening of the dry materials consisting of fodder-plants they may be mixed with grains or other dry rich foodstuff without impairing thus the cohesion of the briquets manufactured from the mixture.

Having thus fully described the invention, what is claimed as new is—

1. A process of manufacturing preserved briquets from agricultural plants without the loss of nutritive substances, consisting in artificially drying the fodder-plants in their fresh state at a temperature to prevent the impairing of the agglutinants contained in the fodder-plants, then slightly moistening the artificially-dried fodder-plants in order to excite the binding effect of the agglutinants contained in the plants, and then finally forming the moistened plants into briquets.

2. A process of manufacturing preserved briquets from agricultural plants without the loss of nutritive substances, consisting in artificially drying the fodder-plants in their fresh state at a temperature to prevent the impairing of the agglutinants contained in the fodder-plants, then leading through the artificially-dried fodder-plants a suitable fluid so as to moisten them in order to excite the binding effect of the agglutinants contained in the plants, and then forming the moistened plants into briquets.

In testimony whereof I have hereunto set my hand in presence of two subscribing witnesses.

EDUARD WÜRL.

Witnesses:
ADOLPH FISCHER,
ARTHUR SCHWERZ.